O. PEHRMAN.
ICE VELOCIPEDE.
APPLICATION FILED DEC. 11, 1907.

899,132.

Patented Sept. 22, 1908.

Witnesses
C. Heymann
L. Wachman

Inventor
Olof Pehrman
by B. Singer Atty

UNITED STATES PATENT OFFICE.

OLOF PEHRMAN, OF STENBACKEN, SWEDEN.

ICE-VELOCIPEDE.

No. 899,132.　　　Specification of Letters Patent.　　　Patented Sept. 22, 1908.

Application filed December 11, 1907. Serial No. 406,038.

*To all whom it may concern:*

Be it known that I, OLOF PEHRMAN, a subject of the King of Sweden, and residing at Stenbacken, Sweden, have invented certain new and useful Improvements in Ice-Velocipedes, of which the following is a specification.

This invention relates to a velocipede for use on ice or snow, and is illustrated by the accompanying drawing.

Figure 1:
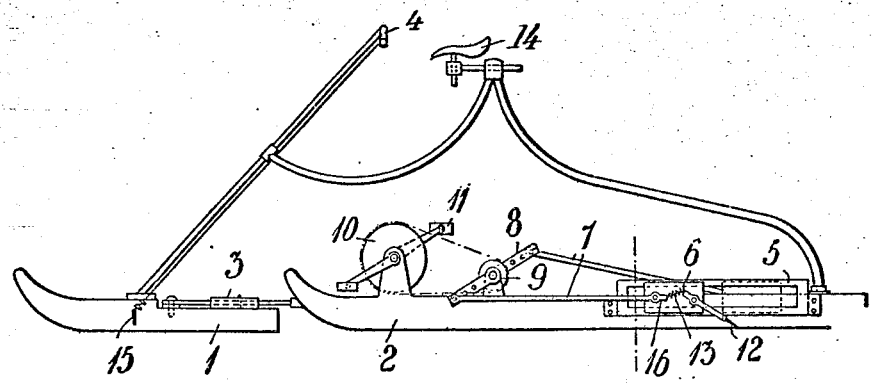
Figure 2:
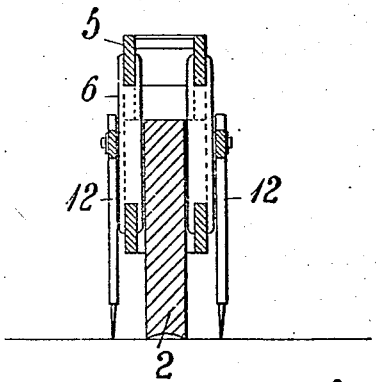

Figure 1 is a side view of the apparatus, Fig. 2 a cross section.

The velocipede has two runners 1 and 2. The fore runner is connected to the back one 2 by a link 3 with adjustable length and besides joins the handle 4. The back runner 2 is provided with guides 5 for reciprocating slides 6, actuated by cranks 8 by means of connecting rods 7. In the cranks 8 are bored a number of holes to adjust the connecting rods for different speeds. The crank shaft is geared to the shaft of the treadles 11 by sprocket wheels 9, 10 and a chain. Each slide 6 carries a pointed lever 12 which is connected to a projection of the corresponding rod 7 by a spiral spring 13 or similar device. The velocipede has a seat 14 and brake 15.

When the treadles are actuated the slides get a reciprocating motion, compelling the points 12 to penetrate the ice or snow during the back stroke, thereby propelling the velocipede. On the forward stroke of the slides the points are raised from the ice or snow by the movement of the connecting rods. The same connection causes the instantaneous penetration of the ice on the return stroke. When the apparatus is used on snow it is convenient to use special runners which may be carried easily.

Having now particularly described and ascertained the nature of the said invention and in what manner the same is to be performed I declare that what I claim is:

1. An ice velocipede comprising in combination, a frame, a front steering runner provided with a steering post movably connected with said frame, a rear runner rigidly secured to said frame, a link connection uniting said front and rear runners and permitting relative movement of one runner with respect to the other, cross-heads slidably mounted on said rear runner, dogs pivotally mounted on said cross-heads and provided with sharp propelling ends, the opposite ends of said dogs projecting beyond said pivotal mountings, crank arms mounted on said rear runner, connecting rods pivotally secured to said cranks and cross-heads and projecting beyond their point of pivotal connection with said cross-heads, springs uniting the projecting ends of said rods and dogs, said rods serving when operated to alternately raise and lower the propelling ends of said dogs out of and into contact with the traction surface, and means for actuating said cranks.

2. An ice velocipede comprising in combination, a frame, a front steering runner connected with said frame, a rear runner secured to said frame, cross-heads slidably mounted on said rear runner, dogs pivotally mounted on said cross-heads and provided with sharp propelling ends, the opposite ends of said dogs projecting beyond said pivotal mountings, crank arms mounted on said rear runner, connecting rods pivotally secured to said cranks and cross-heads and projecting beyond their point of pivotal connection with said cross-heads, springs uniting the projecting ends of said rods and dogs, said rods serving when operated to alternately raise and lower the propelling ends of said dogs out of and into contact with the traction surface, and means for actuating said cranks.

3. An ice velocipede comprising in combination, a frame, a front steering runner connected with said frame, a rear runner secured to said frame, cross-heads slidably mounted on said rear runner, dogs pivotally mounted on said cross-heads and provided with sharp propelling ends and projecting ends, crank arms mounted on said rear runner, connecting rods pivotally secured to said cranks and cross-heads and provided with projecting ends connected with the projecting ends of said dogs and serving when operated to alternately raise and lower the propelling ends of said dogs into and out of contact with the traction surface, and means for operating said cranks.

4. An ice velocipede comprising in combination, a frame, a runner connected with said frame, cross-heads slidably mounted on said runner, dogs movably mounted on said cross-heads and provided with sharp propelling ends, cranks mounted on said runner, connecting rods operatively connecting said cranks and cross-heads and operatively connected with said dogs so that the propelling ends thereof are alternately raised and lowered out of and into contact with the traction surface, and means for operating said cranks.

5. An ice velocipede comprising in combination, a frame, a runner connected with said frame, cross-heads slidably mounted on said runner, dogs movably mounted on said cross-heads and provided with sharp propelling ends, cranks mounted on said runners, connecting rods connecting said cranks and cross-heads, and yielding connections for said rods and dogs serving when the former are operated to alternately raise and lower said dogs yieldingly out of and into contact with said traction surface.

6. An ice velocipede comprising in combination, a frame, a runner connected with said frame, slidable means mounted on said runner, dogs movably mounted on said means and adapted to engage the traction surface, and operated mechanism actuating said slidable means and connected with said dogs to alternately raise and lower the same out of and into contact with the traction surface.

7. An ice velocipede comprising in combination, a frame, a runner connected with said frame, slidable means mounted on said runner, dogs movably mounted on said means and adapted to engage the traction surface, and operated mechanism actuating said slidable means and yieldingly connected with said dogs and serving to raise and yieldingly lower said dogs out of and into contact with the traction surface.

In testimony whereof I have signed my name to this specification in the presence of two subscribing witnesses.

OLOF PEHRMAN.

Witnesses:
    DOLFE BONOD,
    F. A. LANDIN.